United States Patent
Varadarajan et al.

(10) Patent No.: US 8,839,171 B1
(45) Date of Patent: Sep. 16, 2014

(54) METHOD OF GLOBAL DESIGN CLOSURE AT TOP LEVEL AND DRIVING OF DOWNSTREAM IMPLEMENTATION FLOW

(71) Applicant: Atrenta, Inc., San Jose, CA (US)

(72) Inventors: Ravi Varadarajan, Fremont, CA (US); Jitendra Gupta, Pleasanton, CA (US); Sanjiv Mathur, Noida (IN); Priyank Mittal, Ghaziabad (IN); Kaushal Kishore Pathak, Ghaziabad (IN); Kshitiz Krishna, Noida (IN); Anup Nagrath, Noida (IN); Ritesh Mittal, New Delhi (IN)

(73) Assignee: Atrenta, Inc., San Jose, CA (US)

(*) Notice: Subject to any disclaimer, the term of this patent is extended or adjusted under 35 U.S.C. 154(b) by 0 days.

(21) Appl. No.: 14/055,653

(22) Filed: Oct. 16, 2013

Related U.S. Application Data (60) Provisional application No. 61/806,906, filed on Mar. 31, 2013.

(51) Int. Cl.
   *G06F 17/50* (2006.01)
(52) U.S. Cl.
   CPC .................................. *G06F 17/5045* (2013.01)
   USPC ........................................................ 716/113
(58) Field of Classification Search
   CPC ................................ G06F 17/30; G06F 17/50
   USPC ........................................................ 716/113
   See application file for complete search history.

(56) References Cited

U.S. PATENT DOCUMENTS

| | | | |
|---|---|---|---|
| 5,544,066 A | 8/1996 | Rostoker et al. | |
| 5,544,067 A | 8/1996 | Rostoker et al. | |
| 5,933,356 A | 8/1999 | Rostoker et al. | |
| 5,978,573 A | 11/1999 | Ohara | |
| 6,324,678 B1 | 11/2001 | Dangelo et al. | |
| 7,146,595 B2* | 12/2006 | Knol et al. | 716/119 |
| 8,234,609 B2 | 7/2012 | Kurshan et al. | |
| 2005/0204315 A1* | 9/2005 | Knol et al. | 716/2 |
| 2005/0268258 A1* | 12/2005 | Decker | 716/4 |
| 2012/0311513 A1 | 12/2012 | Kurshan et al. | |

OTHER PUBLICATIONS

Amir Hekmatpour et al., "An integrated methodology for SoC Design, Verification, and Application Development", IBM Microelectronics, Proc. of Global Signal Processing Expo and Conference, GSPx (2004, 6 pages.

* cited by examiner

*Primary Examiner* — Thuan Do
*Assistant Examiner* — Mohammed Alam
(74) *Attorney, Agent, or Firm* — Thomas Schneck; Mark Protsik (57) ABSTRACT

System-on-chip (SoC) designs include large amounts of interconnected intellectual property blocks and standard-cell logic using complex bus fabrics. Today SoC design-closure that validates design targets of area, timing, congestion and power constraints is accomplished post routing as over 80% of validation problems are due to global-interconnect. A method is disclosed that allows the designers to achieve global design-closure and physical topology constraints, early in the design cycle, at much higher levels of abstraction. In particular, logic hierarchy of the design is converted into a physical hierarchy of functional-related clusters of locally-connected logic. The clusters and inter-cluster global connections can be refined to meet design constraints in order to generate a top-level floor-plan in the form of library and constraint files. Using the results of this top-down global design-closure method the designers can use the generated floor-plan to guide downstream tools to achieve predictable and correlatable design implementation.

20 Claims, 6 Drawing Sheets

Final Design closure and Validation

METHOD OF GLOBAL DESIGN CLOSURE AT TOP LEVEL AND DRIVING OF DOWNSTREAM IMPLEMENTATION FLOW

CROSS-REFERENCE TO RELATED APPLICATION

This patent application claims priority under 35 U.S.C. 119(e) from prior U.S. provisional application No. 61/806,906, filed Mar. 31, 2013.

TECHNICAL FIELD

The present invention relates to systems and methods for completing design closure for system-on-chip (SoC) integrated circuits. The invention specifically relates to a top-down design method and system that allows for fast and efficient design closure, while meeting area, timing, congestion and power constraints, by enabling physical planning early in the design cycle of the SoC.

BACKGROUND ART

Today's SoCs are very large and complex with large number of IP blocks, memory blocks, and logic connected using one or more interconnect bus fabric. Many of the IP blocks are third party IPs with RTLs licensed from vendors. These base IPs are then customized or hardened to suit the use in the SoC by instantiation of additional memory blocks, adding pipelining to speed up the operation, customizing the bus width and the number of cores and by specifying shape of intellectual property (IP) block and placement of inputs and outputs (I/Os) pins. These IPs typically end up having complexities similar to the SoC itself but on a smaller scale, in that these can have 10s of millions of placeable instances, hundreds of memory blocks or macros, multiple clock trees with differing clock frequencies and multiple power domains. The teams that work on hardening and design closure of the IPs and SoCs typically are different from the RTL designers and have limited access and knowledge of the internal structure of the IP. This makes the process of design closure very complex and time consuming.

Figure 1:
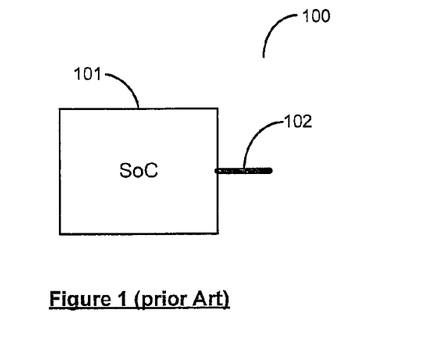
FIG. 1 is a block diagram of prior art SoC.
Figure 2:
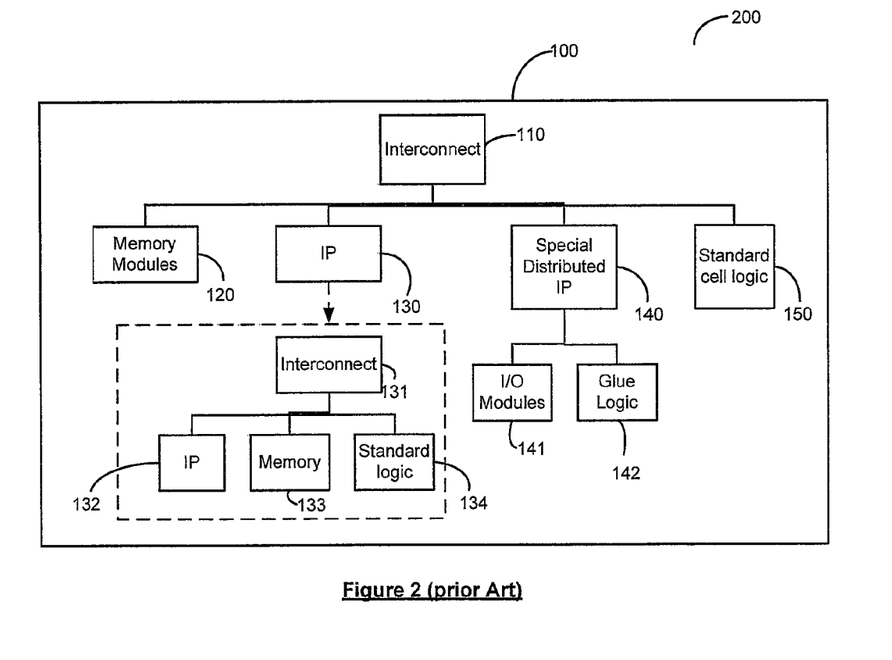
FIG. 2 is an exemplary block diagram showing some of the internal components of the SoC of FIG. 1.
Figure 3:
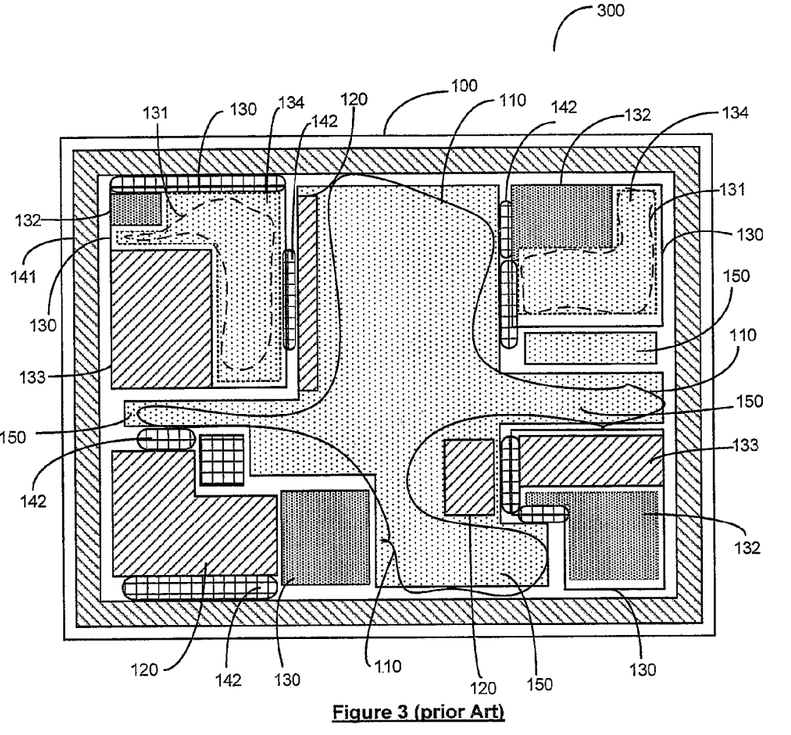
FIG. 3 is an exemplary layout of the components of the SoC of FIG. 2.

FIG. 1 is a block diagram of a SoC 100. It has a circuit block 101 and inputs and outputs I/Os 102. A typical circuit block 101 of the SoC design 200 is shown in FIG. 2 and an exemplary and non-limiting block diagram of a SoC layout 300 is shown in FIG. 3. The circuit block 101 comprise memory blocks 120, intellectual property (IP) blocks 130, specialized distributed logic blocks 140 such as I/O logic 141 and glue logic 142, and standard cell logic 150 all interconnected by an interconnect fabric 110. The IP blocks 130 in the SoC 100 themselves are highly complex SoC level blocks with IP blocks 132, memory blocks 133, and standard cell logic 134, all interconnected using an interconnect fabric 131. The typical SoCs of today require RTL synthesis that generates a gate level net-list of the design, floor-planning, detailed placement of the IPs memory and logic and routing to interconnect the completed design. The current circuit design flows typically do not allow design closure and validation before the detailed place and route is complete even though the critical paths are typically the global routes within the SoC 100. The timing closure and validation, that is meeting area, timing, congestion and power constraints can only be checked after place and route and it is by iterative sequence of these operations that the final design closure can be achieved. Though there have been programs that enable wire modeling providing delay estimates of interconnects, these have not been accurate enough to provide estimates that are realistic below 45 nm technology node as the wiring parasitic dominate the delays. This is also due to the need to have hard IPs 130 inside the SOC 100 which introduces discontinuity in the routing schemes, unlike the standard cells which follow specific routing rules and provide continuity. The hard macros hence limit routability over the IPs 130 placed within the circuit blocks 101 of the SOC 100 and make estimation of routing delays difficult at any time prior to completion of place and route. This makes it impossible to have design closure and validation without completing the final physical planning and place and route of the SoC 100.

It will make design closure of large SoCs faster and cheaper if a method and system can be found that enables physical floor planning and routing, especially global routing of the logic and interconnectivity of the hard IPs during the early design period without waiting till the detailed design and physical layout of the chip is completed. Such a system and method that provides a means to start the physical planning early in the design cycle and also provide a methodology towards achieving early design closure, at higher levels of abstraction, will be of great use in completing a SoC design early, with lower cost of resources.

SUMMARY DISCLOSURE

An electronic circuit design automation method is implemented in a computing system for enabling global design closure at a high level of abstraction with implementation guidance for downstream placement and routing tools.

The method begins with the system receiving a design description comprising a mix of behavioral description, pre-synthesized netlist modules, few missing modules represented as black-box instances, pre-hardened intellectual property blocks (IP) as hard macros (HM), and instantiations of memories also as HM; as well as timing and physical constraints.

The method analyzes input design for purpose of abstracting the design into clusters such that global connectivity and timing can be understood by analyzing the inter-cluster paths, while local connectivity is subsumed within each cluster definition. A visualization method called 'dataflow analysis' is used to analyze global connectivity between these clusters for timing and various physical metrics. The cluster definitions are iteratively refined until all clusters are well-behaved in terms of their size, the planarity of global connectivity, and various physical and timing metric such as snaking paths and re-entrant paths.

Next step is to analyze standard cell logic inside each cluster for congestion and timing criticality and accordingly adjust area budget for each cluster. The HM instances are taken out of clusters and grouped based on their connectivity profile. Floorplan engine optimizes placement for clusters and hard macros as well as shape for clusters based on input physical constraints as well as global paths. The output floorplan is iteratively refined until design closure is achieved based on global timing paths and other physical, congestion and power constraints.

The final floorplan which meets area, timing, congestion and power constraints is used to generate synthesis constraints specific to each cluster, as well as overall placement and routing guidance for hard macros and clusters. The implementation guidance based on early design closure enables efficient implementation for both the SoC as well as underlying IP blocks.

The method provides a capability for planning for design-closure from the start of a design in a top-down manner by:

1. Enabling the floor planning by a process of clustering wherein the logical design hierarchy is converted to a physical hierarchy by breaking down the synthesized logical hierarchy to a physical hierarchy of standard cell clusters;
2. Providing a visual capability to the designers to follow data flow within the design using cluster layout;
3. Floor-planning, shaping and placing the clusters along with the placement of memory macros, black or gray box logic, and special clusters such as I/O logic or glue logic clusters to enable the analysis of the global interconnects of the design and to allow for early optimization and validation of the design closure based on the global interconnect;
4. Enabling grouping and placement of hard macros (IPs) based on connectivity timing and power constraints along with the placement and shaping of the logic clusters;
5. Using small groupings or clusters of locally connected logic to define optimum placement of the design for reducing global routing needs and improving timing;
6. Dynamically sizing the cluster to adjust its utilization based on the internal complexity of the cluster;
7. Separating the timing paths in the design into global timing paths (inter-cluster) and local timing paths (intra-cluster) to optimize each independent of the other; and
8. Providing up-front capability to optimize the global routing needed, minimize clock tree distribution, and reducing re-entrant and snaking routes to optimize timing and congestion closure.

The method also enables early back-end optimization by:
1. Mapping data flow of the developed physical hierarchy into a floor plan in which clusters are shaped and placed optimally and I/O clusters and glue logic clusters are placed in a distributed fashion meeting the constraints of the design;
2. Estimating wire delays of long paths based on routing estimates and optimizing cluster placement to reduce wire delays and achieve timing closure;
3. Iterating the floor plan to reduce global timing issues and meet the timing constraints; and
4. Fixing the location of hard macros and cluster locations enabling generation of a physical topology constraint file that is used for place and route, that is physical synthesis of back end.

DETAILED DESCRIPTION

System-on-chip (SoC) 100 designs include large amount of interconnected intellectual property (IP) blocks 130, memory 120 and standard-cell logic 150, using complex bus fabrics 110. The IP blocks 130 are customized or hardened to the target constraints of SoC design 101 by fixing the core dimensions and shapes. Today SOC design-closure that validates design targets of area, timing, congestion and power constraints are accomplished post routing as a majority of validation problems are due to global-interconnect. This iterative and time consuming validation process towards the tail end of design cycle extends the design time and cost of design of the SOC.

A system and method are disclosed that allow the designers to achieve global design-closure and physical topology constraints, early in the design cycle, at much higher levels of abstraction. Using the results of this top-down global design-closure method the designers can guide the downstream tools to achieve predictable and correlatable design implementation.

The disclosed method can be applied to both hardening a complex IP block or to the design closure of a complex SoC that instantiates one or more IP blocks.

Figure 4:
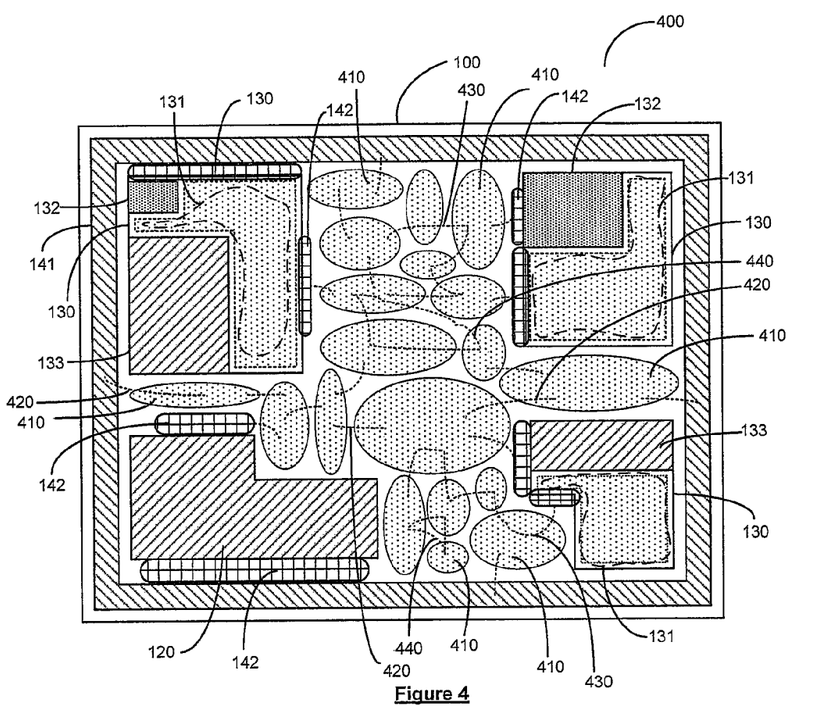
FIG. 4 is an exemplary layout of the components of the SoC organized as per the current invention.

FIG. 4 is an exemplary and non-limiting block diagram of early implementation of a SoC physical planning 400 at a higher abstraction as per the disclosed invention. The invention enables a path to easier physical layout and validation by engaging with the design early in the design cycle, working towards meeting the constraints of the design at a high level of abstraction within the context of the floor-plan. Since it has been found that the global paths of the design, especially designs implemented at or below 28 nm technology, form the critical paths which create problems at the design closure, the invention provides the means to optimize the global paths at the early stages of the design cycle.

The early top level planning of the SoC 100 in FIG. 4 identifies the hard IP 130 and memory modules 120 as well as the special distributed IPs 140 such as I/Os 141 and glue-logic 142. The invention enables floor planning by a process of clustering or grouping of the logical design into functional clusters by breaking down the synthesized logical hierarchy. These functional clusters are then converted to a physical hierarchy of standard cells where each cluster comprises one or more related functionality. The logic component of the SoC 100, typically comprised of standard cell logic 150. The clustering operation results in this standard cell logic 150 being divided into small size clusters 410 based on functional design grouping. These functional clusters from logical design are converted to physical clusters 410 that are laid out with the pre-placed and defined hard IP 130, memory modules 120 and distributed IP 140 during floor planning. The cluster 410 placement locations are decided based on the data-flow within the SoC 100 and cluster placement is planned at a top hierarchical level for the SoC 100. The clusters 410, the hard IP 130, memory modules 120 and the distributed IP 141 are then interconnected globally using the global interconnect 420. The placement and global interconnect is optimized for meeting the timing constraints on the global interconnect paths. This is achieved by reducing the inter-cluster connection lengths and taking care of any snaking paths 430 and re-entrant connections 440 between the placed clusters 410 by adjusting the placement of the clusters 410. The global routing connection to the hard IPs 130, any black or gray box logic that is being defined, memory IPs 120, and distributed IPs 140 which contain I/Os 141 and glue-logic 142, are also planned as part of the global routing 420. The location of the hard IP 130, gray box logic, the memory modules 120 and the connection to the distributed IP are also adjusted to reduce path lengths in the global routing 420. This preliminary top level layout and interconnect planning enables the analysis of the global interconnect for early understanding of the issues in design closure. The early recognition of issues provides the ability to take early corrective action by modification of the logical and physical design to meet the area, timing, congestion and power constraints of the design. Further the use of interconnected function based clusters 410 allows the optimization of clock distribution to the various functional design groups to be addressed early and optimized. Another advantage of this design method using clusters is the capability provided to the designers to visualize the dataflow through the design early in the design cycle and adjust the placement and grouping of clusters with the other components of the design. This capability also allows for early planning for optimization of design and leads to easier design closure of the SoC 100.

Figure 5:
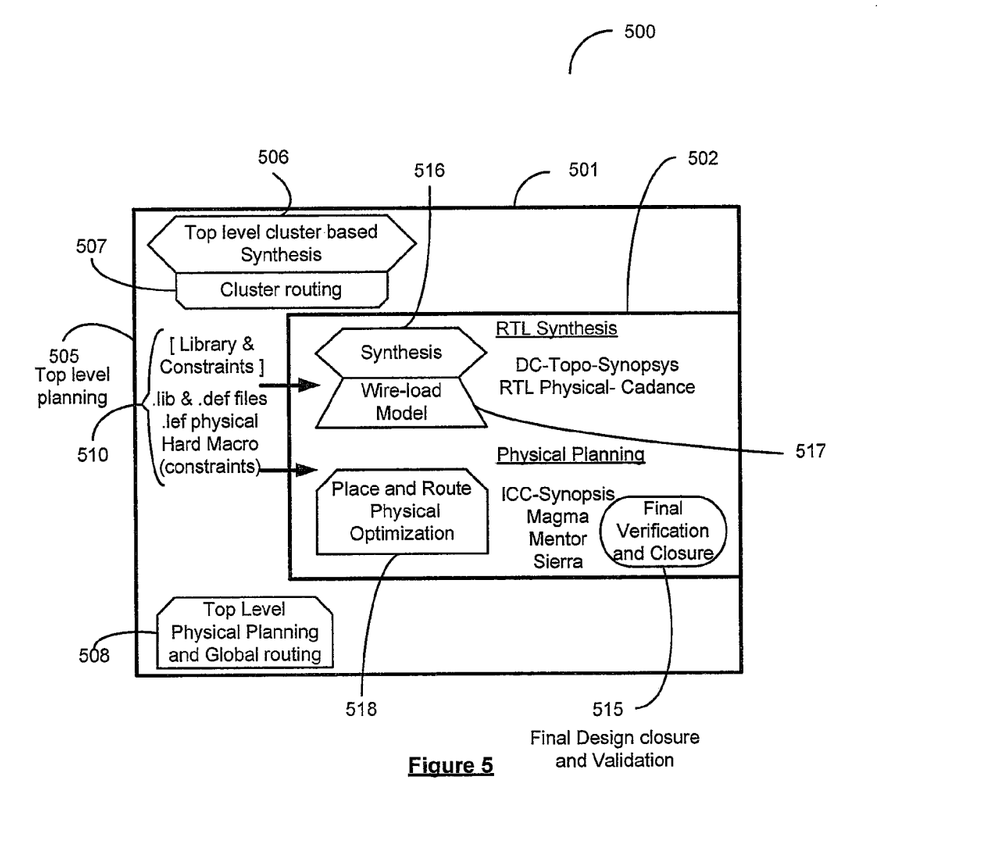
FIG. 5 is an exemplary block representation of a system for implementing the present invention.

FIG. 5 is a block diagram representation 500 of an electronic design automation (EDA) system having sufficient processing power and storage capability for implementing the invention on a computer based design system 501. The EDA system uses computer aided design tools (CAD) for design and design closure of the SoC 100. The top level planning tool 505 accepts the logical design hierarchy. This logical design input is provided to the top level cluster based synthesis and conversion module 506 which converts it into a physical hierarchy of standard cell clusters. This is done by breaking down the synthesized logical hierarchy to a physical hierarchy comprising groups of standard cells based on functionality within the design. These functional groups of standard cells grouped as clusters are then routed using the cluster routing module 507 of the top level planning tool 505. These routed clusters are provided to the top level physical floor planning and global routing module 508 of the top level planning tool 505. The clusters are floor-planned and shaped and placed along with the memory macros 120, black or gray box logic, IP logic 130, and special distributed IP logic 140 such as I/O logic 141 or glue logic clusters 142. The top level physical planning and global routing module now generates the top level global routing 420 for the design. This includes the inter cluster interconnect and the connections to the hard IP 130, memory modules 120 and the distributed IP 140. This initial place and route enables the designers to have an early view of the data flow within the design for placement and design optimization. The early analysis of the global interconnects of the design allow optimization of the global interconnect to reduce or eliminate snaking paths 430 and re-entrant connections 440 between the placed clusters for early optimization of the design closure based on the global interconnect 420. The placement and routing of the functional clusters 410 and the memory macros 120, black or gray box logic, IP logic 130, and special distributed IP logic 140 also allow early design of clock trees for optimized clock distribution within the designed SOC 100.

The top level planning tool 505 generates a library and constraint file 510 to be passed into the design closure and verification tool 502. This library and constraint file 510 includes the design library (.lib), module definition (.lef), hard macro constraints file (.def) and custom directives script extracted from the top level synthesis, clustering, placement, local and global routing of the design. The custom directives script includes, but is not limited to, directives to RTL synthesis tools about cells types to use, and cluster placement guidance to place-and-route tools. The design closure and verification tool 502 uses the library and constraints file 510 provided by the top level planning tool 501 as a starting point to complete the final re-synthesis of the design using any of the available synthesis programs 516, such as DC-Topo from Synopsys or RTL Physical from Cadence Design Systems. The design closure and verification tool 502 also uses the available library and constraints file 510 as the initial input to the backend physical synthesis and place and route tools 518, such as Synopsys (ICC), Cadence (Encounter), Mentor Graphics (Olympus). A wire model program 517 associated with the synthesis tool can be used to ensure that all interconnection information provided are able to achieve the speeds. Having a pre-optimized starting point for the synthesis and place and route optimizer 518 allow the final optimization of the operation to be faster. The placed and routed SoC is now checked against the original design constraints and timing closure constraints in the final verification and timing closure module 515 of the design closure and verification tool 502 before being released for manufacturing. The use of the top level planning tool 501 to optimize the global and local placement and delays help speed up the final optimized floor planning, global routing, verification and timing closure of the product, leading to reduced time for design completion.

Figure 6:
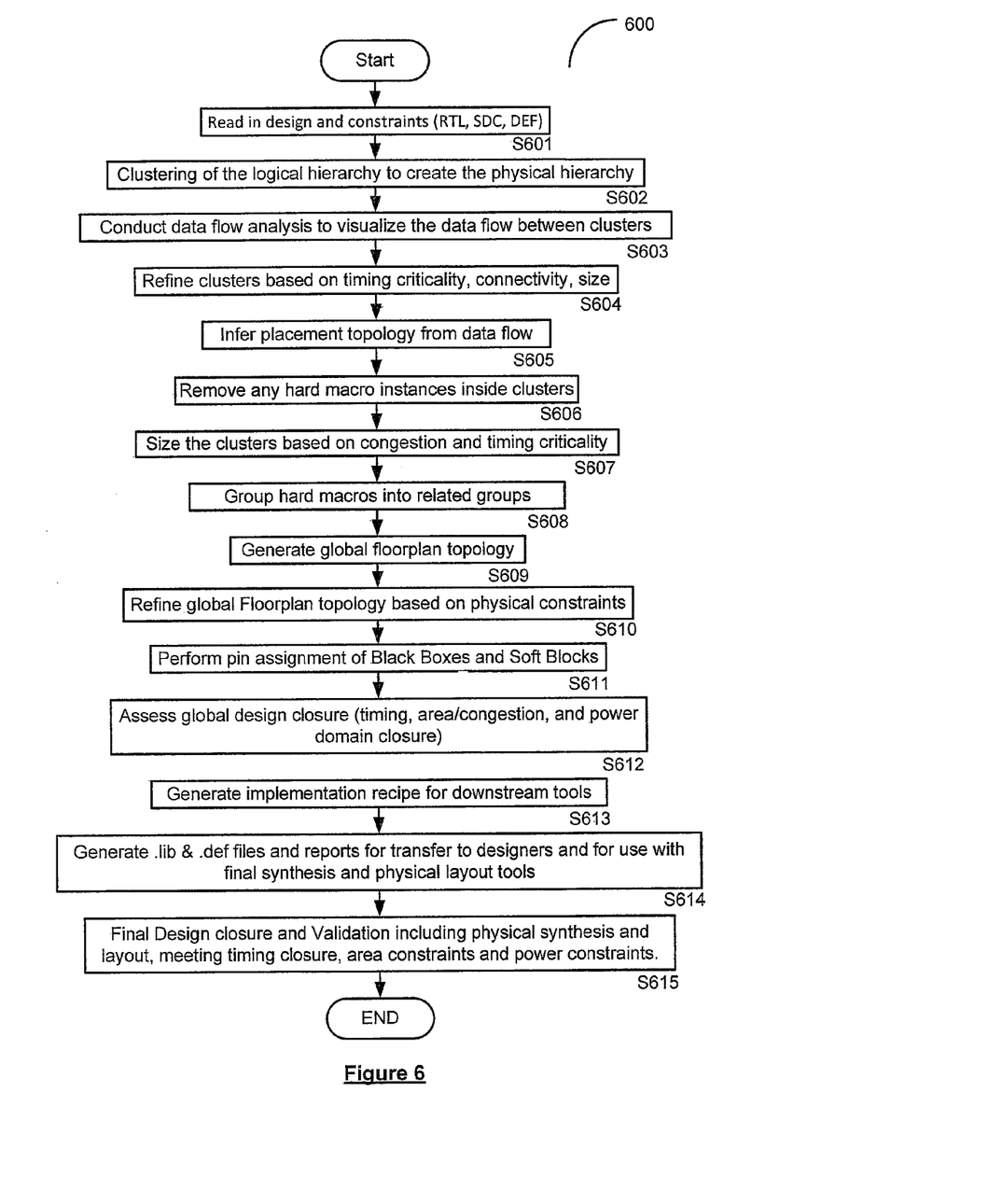
FIG. 6 is an exemplary flow diagram of the current invention.

FIG. 6 is an exemplary flow diagram 600 of the current invention. It should be noted that though the flow chart provides one sequence of operations to achieve the aim of the invention, it is possible to have some of the steps in different sequence to achieve the same end. The alternate flows achieving the same end result is hence included in the disclosed invention. The method comprises:

Step 601: Read RTL design description and synthesize to an internal structural representation. The RTL description usually comprise any or all of a mix of behavioral description, pre-synthesized net-list modules, few missing modules represented as black-box instances, pre-hardened intellectual property blocks (IP) as hard macros (HM), and instantiations of memories also as HM. The internal structural representation is a combination of logic gates, Black boxes, Soft blocks, IP blocks, hard-macro instances and is optimized for input timing constraints to ensure the structural representation reflects the timing requirements of the input design. Further read in the optional top-level physical constraints usually specified in a DEF file. These constraints provide additional information about physical area (shape and size) for the design, and the location of the primary input/output interfaces, and optional placement constraints on pre-hardened IP blocks.

Step 602: Analyze the design for its logic hierarchy, connectivity and timing relationship between various logical modules, as well as connectivity of peripheral logic to pre-placed input/output, as well as HM control logic to HM instances. Logical modules or standard cell logic is grouped into functional clusters resulting in the physical hierarchy for the design. This process abstracts the design into clusters such that global connectivity can be analyzed by analyzing the inter-cluster paths, while local connectivity is subsumed within each cluster definition. The clusters can be of two types, functional logic clusters which form the bulk of the design, and distributed clusters which could further be either IO logic clusters or glue-logic clusters. In the final layout, the instances in logic clusters are typically placed in confined area, whereas the instances of distributed clusters are often spread out over the floor-plan area.

Step 603: Analyze the global connectivity between various clusters to provide a visualization of data flow within the design. This is also called 'dataflow analysis'. During this operation the HM instances are assumed to be inside their parent cluster and the connectivity and timing is analyzed to each cluster as a whole. The connectivity is analyzed for the amount of connectivity (number of nets or throughput), timing-criticality of the connectivity (clock frequency the connection is operating on), functionally significant bus interface connections, connectivity to constrained IO locations, and connectivity crossing physically significant domains such as clock, power or voltage domains.

Step 604: Iteratively continue the data flow analysis until all clusters are well behaved. The result of connectivity or dataflow analysis is to refine cluster definitions until all clusters are well-behaved. The clustering and data flow analysis are iterated till the clusters meet the following criteria:
   a. All clusters sizes are in preferred range of 5000-50000 instances, and the number of signals at each cluster boundary is not too high relative to the size of standard cell logic inside the cluster;
   b. The inter-cluster connectivity represents actual global connectivity, and is not the result of sub-optimal clustering;
   c. The connectivity across clusters is mostly planar (meaning the number of crisscross connectivity is minimal); and
   d. There are minimal snaking or re-entrant paths—basically timing paths which are either snaking (go through multiple clusters) or re-entrant (cross through same cluster twice or more). Also the critical paths (high speed paths) have minimal number of cluster crossings.

When the clusters meet the criteria the iterative operation is stopped and clusters are considered to be well behaved.

Step 605: The dataflow analysis (based on cluster definitions which have been refined as necessary) is used to determine the relative spatial relationship between clusters and cluster placement. This means identifying or marking the clusters which need to stay close to each other, as well as those which should be close to specific primary IOs.

Step 606: Update the cluster definitions to remove Hard-Macro instances within clusters. Now clusters only contain standard cell logic that will usually stay together in a global floor-plan topology. This step ensures that routing resources inside the cluster are continuous for placing and routing standard cells instances inside each cluster. Exception to this requirement are the distributed clusters, which are either glue-logic clusters (logic that will be dispersed throughout the global floor-plan as needed) or peripheral IO logic cluster (for which both the cluster content and cluster placement is driven by the location of primary IO to which it connects).

Step 607: The standard cell logic clusters (as updated in prior step) are analyzed for internal congestion. The internal congestion (or structural complexity of logic contained inside each cluster) is used to determine the appropriate size of cluster. The cluster size is optimized to increase gate density for clusters having low congestion and gate density is reduced for clusters with high congestion, providing more white space within clusters for routing. In addition, the cluster logic is analyzed for timing-criticality. The timing-critical clusters are provided additional margin in area budget to account for post-floor-plan timing optimization. The clusters are adjusted based on the results, of this analysis to reduce the congestion and meet timing criticality.

Step 608: The HM instances are analyzed for their connectivity to clusters. All HM instances which are similar in connectivity are grouped and abstracted into a hard macro group (HM group) for subsequent dataflow and global floor-plan topology analysis. The HM grouping reduces the total number of top-level objects to analyze for dataflow and global Floor-planning topology analysis. Dataflow analysis is repeated to review connectivity. This analysis helps to determine any global placement guidance constraints for next step.

Step 609: All physical constraints (defined in input DEF file), clusters (connectivity and size), HM groups, and user-specified global placement guidance constraints are analyzed with reference to the design in a floor planning step. This floor-planning step defines the following:
   a. The shape and location of all clusters;
   b. The shape and location for all HM groups;
   c. The location of all IP Blocks;
   d. The location of all HM instances;
   e. Minimized connection delay (as measured by wire length);
   f. Optimize floor-plan timing as measured by timing report of critical paths (number of critical path delays, any failing paths, negative slack and total negative slack); and
   g. Satisfy constraints as defined in input DEF or user's global placement guidance, and generates the top level floor-plan topology for the design.

Step 610: Refine design constraints or guidance and repeat the previous step as needed. This refinement includes:
   a. Add, modify or remove user's global placement guidance;
   b. Modify HM grouping; and
   c. Clone a small cluster where necessary
to further optimize the top level floor-planning to meet the constraints.

Step 611: If any of placeable objects was a soft block or black box, such block can now be analyzed and optimized for pin-placement on the boundary of such block (as shaped by the floor-planning step). The physical constraint (DEF) and timing constraints (SDC) for such a block can be generated and used as top-down constraint for the implementation of each such block.

Step 612: Check for global design closure by analysis of:
   a. Timing closure (no grossly failing global timing paths);
   b. Congestion closure (global routing demand consistent with available supply, including in all routing channels and over the block routing); and
   c. Power domain closure (region shape, size and location to implement hierarchy corresponding to each power domain) for the top level design.

Step 613: After global design closure is established, the implementation recipe is generated based on reporting:
   a. Placement constraint for all HM instances;
   b. Placement guide for all logic modules (as defined by clusters);
   c. Shape, size, pin interface and timing constraint for soft blocks; and
   d. Shape, size and location for power-domain regions.

This implementation recipe is generic. However, it may be output as a combination of DEF (standard format), constraints (custom format based on target implementation tool), and reports (guidance for implementation team).

Step 614: The library and constraint files that include the design library (.lib), module definition (.def) and hard macro constraints files are extracted for the legal floor plan. The library and constraint files are transferred to the final synthesis, place and route tools to be used as a starting point for the final design completion.

Step 615: Final design synthesis, place and route, design validation and design closure are completed using the library and constraint files provided as the initial input. The finished design is checked to ensure that it meets all the design constraints including area, timing, congestion and power.

Having an initial valid starting point, that conforms to the constraints of design closure, such as floor-planning for meeting area, global routing for meeting timing etc., generated from the top level planning tool will enable fast convergence to meet all constraints of the design during final design closure. This will enable the design to be optimized at the back end with minimum iterations to achieve timing closure, validation and verification, leading to faster and more efficient design completion.

Figure 7:
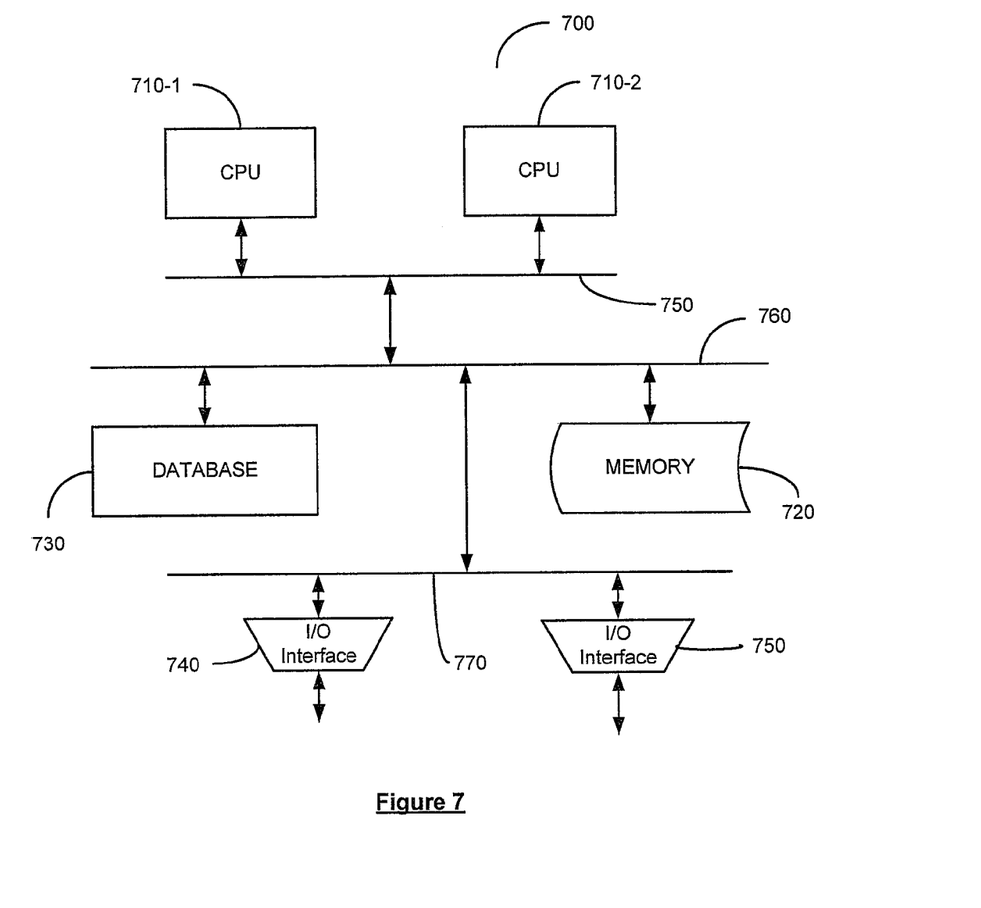
FIG. 7 is an exemplary block diagram of a computer platform, such as a server unit, for implementing an electronic design automation system as in FIGS. 5 and 6 in accord with the current invention.

The principles of the invention are implemented as hardware, firmware, software or any combination thereof, including but not limited to a computer aided design (CAD) system and software products thereof, the software designed to execute on an appropriate apparatus for execution of the plurality of instructions that are contained in the software. Moreover, the software is preferably implemented as an application program, comprising a plurality of instructions, tangibly embodied on a program storage unit or computer readable medium and executed on a computing device such as a server EDA system 501 of FIG. 5. The application program may be uploaded to, and executed by a machine comprising any suitable architecture. Preferably, the machine is implemented on a computer platform, a non-limiting example of which is shown in FIG. 7. The EDA system of FIG. 5 is typically implemented using a computer server unit 700, the block diagram representation of which is shown in FIG. 7, having hardware such as one or more central processing units ("CPUs") 710-1 and 710-2, a memory 720, and multiple input/output interfaces 740 and 750 respectively. The computer platform 700 may also include an operating system and microinstruction code that may be stored in memory 720 in part or in whole or in database 730 in part or in whole. The database 730 may further store the components of the design of an IC being operated upon according to the principles disclosed herein. The computer platform 700 may include more than one memory or more than one type of memory. The various processes and functions described herein may be either part of the microinstruction code or part of the application program, or any combination thereof, which may be executed by the CPU 710, whether or not such computer or processor is explicitly shown. In addition, various other peripheral units (not shown) may be connected to the computer platform such as but not limited to a keyboard, a mouse, an additional data storage unit, a printing unit and/or display unit. The CPU 710, memory 720, database 730, interface to input devices 740 and interface to output devices 750 may communicate over one or more communication links 760, 770 and 780 which may be, but is not limited to, a bus, a network, and the like. Though the system is shown as being implemented in a single server, this should not be considered limiting as the server may be a virtual machine, with all the above capabilities, distributed over multiple servers or the cloud.

It will be evident to one of ordinary skill in the art that the techniques described hereinabove can be used to great advantage in providing significant automation of the process of designing integrated circuits such as SoCs as well as other electronic systems, including board level systems, custom integrated circuits, ASICs, PLD's, sequential controllers, etc. In particular, the techniques described are well suited to automated design activities of large electronic design projects, providing an orderly, directed sequencing of those design activities from the initial design stages in a top down fashion to complete the design.

The techniques described are well suited to automated optimization of large (or small) electronic design choices. These techniques permit iterative partitioning of an electronic design during the design stage, particularly at early stages of where it is possible to make trade-offs between major design criteria and floor planning choices without undue lost effort. These techniques rely on repeated iteration of floor planning and placement of the components of the design, IPs, memory and functional clusters of logic to reduce the global and cluster level interconnect delays and hence meet various performance parameters (e.g., power dissipation, chip area, timing compliance etc.) and analyzing them according to user specified priorities against specified limits to select design constraints and choices which yield an implementation which meets all design goals in as near optimal a fashion as possible.

What is claimed is:

1. An electronic circuit design automation method implemented in a computing system for providing global design closure at a high level of abstraction with direction for downstream floor planning and routing, the method comprising:
   receiving by the computing system a description of at least a portion of a synthesized logic design;
   performing a functional analysis by the computing system of a logic hierarchy of the received design to produce a corresponding physical hierarchy with clusters of locally-connected logic;
   iteratively checking by the computing system intra-cluster routing congestion and timing to redefine clusters and mapping data flow to define placement of clusters and inter-cluster interconnectivity;
   placing by the computing system any hard macros of the received design based on connectivity timing and power constraints;
   generating by the computing system a top-level global floorplan topology based on the placement of clusters and received physical constraints;
   analyzing by the computing system timing delay in inter-cluster global data paths and refining the floorplan topology to reduce delay; and
   generating by the computing system and storing in a memory a set of library and constraint files for the refined floorplan topology for the synthesized logic design.

2. The method as in claim 1, wherein the receiving of the synthesized logic design description is accompanied by a specification of any top-level physical constraints to the design.

3. The method as in claim 1, wherein checking intra-cluster routing and congestion and timing redefines clusters such that cluster sizes are in a preferred range of instances with a number of signals at cluster boundaries are within a specified limit relative to cluster size.

4. The method as in claim 1, wherein placement of clusters is defined such that inter-cluster connections have minimal snaking and re-entrant paths.

5. The method as in claim 1, wherein generating the top-level global floorplan topology defines a shape and location of all clusters and all hard macros, location of all distributed I/O and glue logic modules, and inter-cluster global data paths.

6. The method as in claim 1, further comprising verifying by the computing system an absence of any grossly failing global data paths with regard to timing constraints, consistency of global routing demand with available supply, and correspondence of locations with each power domain in the design, and iteratively repeating by the computing system any previous step until verification is achieved.

7. A method implemented in automated electronic design software executed by a computing system for early timing closure of an electronic circuit comprising:
   receiving by the computing system a synthesized logical design representing an electronic circuit;
   identifying by the computing system the functional blocks and various inter-related functional blocks in the received logical design that can be clustered;
   converting by the computing system a synthesized logical design hierarchy to a physical design hierarchy;

converting by the computing system the physical design hierarchy into clusters of devices based on an interrelated functionality;

shaping, placing and routing the clusters by the computing system;

floor-planning by the computing system the physical design with all IP blocks, distributed IP, memory and routed clusters;

inter-connecting by the computing system the clusters, the IP blocks, memory and distributed IP to generate global routing;

changing the floor planning of the clusters by the computing system to reduce snaking paths and re-entrant paths within the global routing pattern;

providing to the designers by the computing system a view of a data flow within the design to optimize data paths;

estimating by the computing system wire delays within the global path to improve delay performance of the design;

generating by the computing system a top level floor planning and interconnect for the physical design;

checking and verifying by the computing system the timing delays and area constraints against design constraints provided; and generating by the computing system and storing in a memory a set of library and constraint files to be passed on to verification and timing closure tools to enable fast convergence of final place and route and timing closure operation meeting all the design constraints.

8. The method as in claim 7, wherein converting the synthesized logical design hierarchy to a physical design hierarchy is carried out by breaking down the synthesized logical hierarchy of standard cell devices and using functional blocks of cells to form clusters.

9. The method as in claim 7, wherein floor planning the physical design includes shaping and placing the clusters along with placing memory macros, black or gray box logic, and special clusters such as I/O logic or glue logic clusters.

10. The method as in claim 7, further including grouping and placement of hard macros (IPs) by the computing system based on connectivity timing and power constraints along with the placement and shaping of the logic clusters.

11. The method as in claim 7, wherein shaping of clusters includes checking and reducing routing congestion within each cluster.

12. The method as in claim 7, wherein routing the clusters and interconnecting the clusters includes independently optimizing local intra-cluster and global inter-cluster timing paths of the design.

13. The method as in claim 7, wherein floor planning the physical design includes mapping data flow of the physical design hierarchy to optimally shape and place logic clusters, and distribute I/O clusters, glue logic clusters so as to meet timing constraints of the design.

14. An electronic design automation system for providing global design closure of an electronic design at a high level of abstraction including direction for downstream floor planning and routing, comprising at least one processing unit, a database accessible by the processing unit, and a memory accessible by the processing unit, the database storing at least a portion of a synthesized logic design, the memory storing a set of program instructions of a top-level planning tool that when executed by the processing unit configure the system to:

receive a description of at least a portion of a synthesized logic design and store the received description in the database;

perform by the at least one processing unit a functional analysis of a logic hierarchy of the received design to produce a corresponding physical hierarchy with clusters of locally-connected logic;

iteratively check intra-cluster routing congestion and timing to redefine clusters and mapping data flow to define placement of clusters and inter-cluster interconnectivity;

place any hard macros of the received design into hard macro groups based on connectivity, timing and power constraints;

generate a top-level global floorplan topology based on the placement of clusters, hard macro groups and instances and received physical constraints;

analyze timing delay in inter-cluster global data paths and refining the floorplan topology to reduce delay; and generate and store in the database a set of library and constraint files for the refined floorplan topology for the synthesized logic design.

15. The system as in claim 14, wherein performing the functional analysis includes identifying and clustering interrelated functional blocks in the received description of the synthesized logic design.

16. The system as in claim 14, wherein the generated floor-plan topology includes all IP blocks, distributed IP, memory and routed clusters that are interconnected to generate global routing.

17. The system as in claim 16, wherein the system is further configured to change floor-plan topology of clusters as needed to reduce any snaking or re-entrant paths within the global routing pattern.

18. The system as in claim 14, wherein analyzing by the system of timing delay includes estimating wire delays within inter-cluster global data paths.

19. The system as in claim 14, wherein the set of library and constraint files stored in the database are accessible to verification and timing closure tools for convergence of final place and route and timing closure operations upon the generated floor-plan topology that meet all specified design constraints.

20. The system as in claim 14, wherein the computing system is a computer-aided design (CAD) system.

* * * * *